United States Patent [19]
Barbee, Jr. et al.

[11] Patent Number: 5,742,471
[45] Date of Patent: Apr. 21, 1998

[54] NANOSTRUCTURE MULTILAYER DIELECTRIC MATERIALS FOR CAPACITORS AND INSULATORS

[75] Inventors: Troy W. Barbee, Jr., Palo Alto; Gary W. Johnson, Livermore, both of Calif.

[73] Assignee: The Regents of the University of California, Oakland, Calif.

[21] Appl. No.: 755,619

[22] Filed: Nov. 25, 1996

[51] Int. Cl.$^6$ .................. H01G 4/06; H01G 4/20
[52] U.S. Cl. .......... 361/312; 361/321.2; 361/322; 361/321.1; 29/25.42
[58] Field of Search .............. 361/301.4, 301.5, 361/306.3, 311–313, 320, 321.1–321.5, 322, 328, 326, 330; 257/528, 532; 29/25.42; 428/610, 660, 627, 632, 635, 698, 702

[56] References Cited

U.S. PATENT DOCUMENTS

| | | | |
|---|---|---|---|
| 4,437,139 | 3/1984 | Howard | 361/313 |
| 4,827,323 | 5/1989 | Tigelaar et al. | 257/534 |
| 4,868,711 | 9/1989 | Hirama et al. | 361/321.1 |
| 4,873,610 | 10/1989 | Shimizu et al. | 361/313 |
| 5,262,920 | 11/1993 | Sakuma et al. | 361/321.5 |
| 5,472,795 | 12/1995 | Atita | 428/660 |

OTHER PUBLICATIONS

Juan M. Elizondo and A. E. Rodriguez, "Novel High Voltage Vacuum Surface Flashover Insulator Technology," XVth International Symposium on Discharges and Electrical Insulation in Vacuum, Darmstadt, 1992.

*Primary Examiner*—Kristine L. Kincaid
*Assistant Examiner*—Anthony Dinkins
*Attorney, Agent, or Firm*—Henry P. Sartorio; Richard B. Main

[57] ABSTRACT

A capacitor is formed of at least two metal conductors having a multilayer dielectric and opposite dielectric-conductor interface layers in between. The multilayer dielectric includes many alternating layers of amorphous zirconium oxide ($ZrO_2$) and alumina ($Al_2O_3$). The dielectric-conductor interface layers are engineered for increased voltage breakdown and extended service life. The local interfacial work function is increased to reduce charge injection and thus increase breakdown voltage. Proper material choices can prevent electrochemical reactions and diffusion between the conductor and dielectric. Physical vapor deposition is used to deposit the zirconium oxide ($ZrO_2$) and alumina ($Al_2O_3$) in alternating layers to form a nanolaminate.

10 Claims, 1 Drawing Sheet

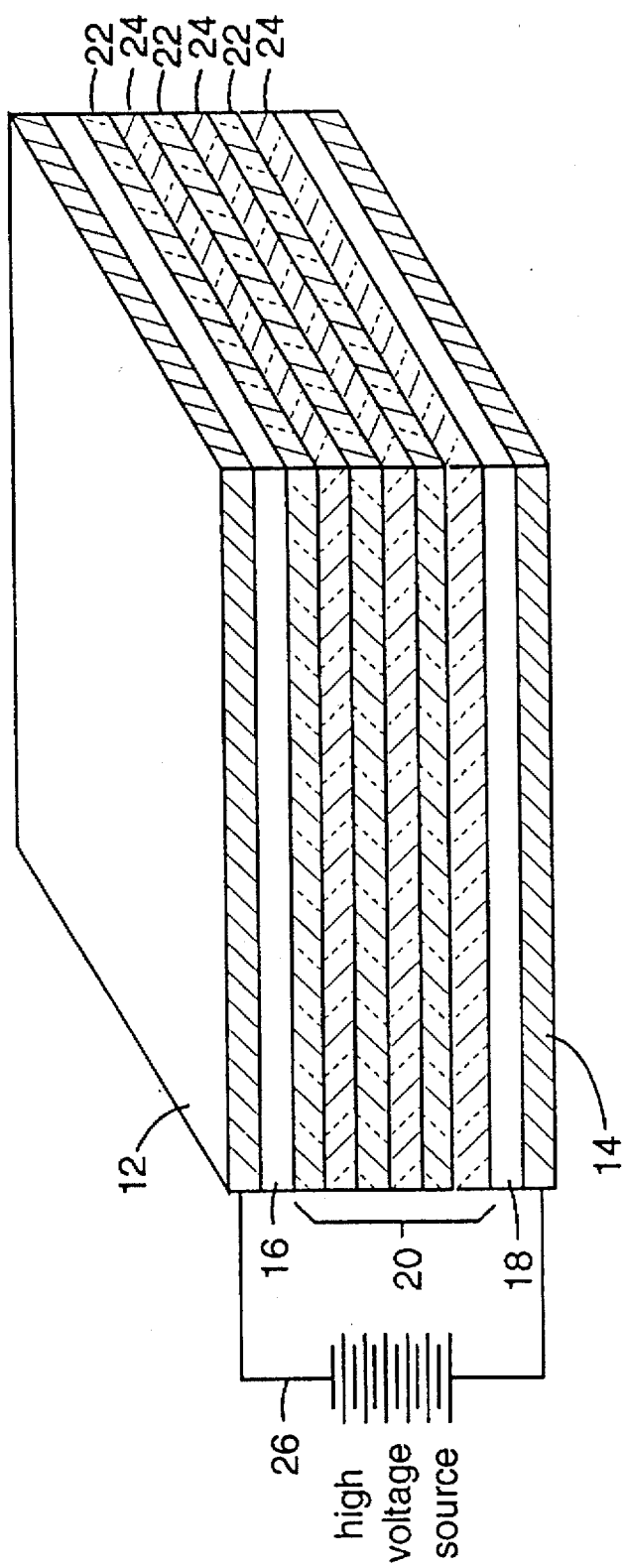

NANOSTRUCTURE MULTILAYER DIELECTRIC MATERIALS FOR CAPACITORS AND INSULATORS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to insulator and dielectric material fabrication and more particularly to nanostructures of multilayers that exhibit extended dielectric characteristics and production methods for fabricating such multilayer nanostructures.

2. Description of Related Art

The energy density of a capacitor is related to the dielectric constant of its dielectric and the maximum voltage that can be applied, e.g., its breakdown voltage. Since most capacitor energy storage systems have severe limits on the space that can be devoted to storage capacitors, it is advantageous to use capacitors that simultaneously have very high capacitance and breakdown values relative to their physical size. Thus improved dielectrics are needed to advance such art.

Conventional dielectric materials for capacitors, accelerators, and other high-voltage applications are typically made from metal oxides, polymers, or other bulk materials. Simple homogenized mixtures of such materials are also conventional. Very often, a high voltage breakdown and a controllable dielectric constant are two of the principle objectives in most applications. Polymer films used as dielectric layers and dielectric mixtures spread over a conductive surface are common ways to fabricate capacitors. But such prior art techniques more-or-less prevent being able to control the purity and atomic structure perfection of such materials. In order to realize high voltage standoff values, the layers also need to be made extremely flat and smooth. Very thin dielectrics are not practical with prior art techniques, so only a limited range of materials can be reliably combined. A process is needed that addresses such limitations by allowing thin, smooth, fully dense, pure layers to be freely combined.

The construction of nanostructure multilayer materials and dielectrics in capacitors is described in U.S. Pat. No. 5,414,588, and was issued to the present inventors. Such patent is incorporated herein by reference.

Layered insulators have been described in the prior art, e.g., alternating dielectric and electrically floating conductive layers interleaved in a solidified stack to increase the overall breakdown voltage. Juan M. Elizondo and A. E. Rodriguez, of Tetra Corporation (Albuquerque, N.M.), published an article titled, "Novel High Voltage Vacuum Surface Mashover Insulator Technology", in the XVth International Symposium on Discharges and Electrical Insulation in Vacuum, Darmstadt, 1992, in which a "microstack insulator" is described. The insulation strength is increased by embedding electrically floating conductive layers in alternating sheets with dielectric films. The so-called "electron hopping distance" was assumed to define the maximum dielectric thickness that was useful, e.g., 500 µm. The correct scale size to interrupt the surface voltage breakdown was said to be driven by the subtle considerations of what it takes to disrupt the precursor streamer, not the heating phase. Once a streamer has created a moderate conductivity path, it is too late to prevent breakdown; so streamer creation is addressed by the proposed structure. The microstack was assumed to act as a capacitive voltage divider, and the voltage between layers was assumed to be a constant on the time scale of streamer creation. Such microstack insulators can be designed for specific pulse periods and for known residue gases in a system. Conductors such as copper and tungsten were either too soft or too hard, and dielectrics such as NYLON, TEFLON, and LEXAN (polycarbonate) were too unstable or melted during fabrication with a loose preassembled stack that was hydraulically pressed into a solid block. So samples were made with 0.010" sheets of MYLAR and stainless steel in conical stacks that were cured by twenty hours of heating and then surface polished.

Such prior art structures and methods have proven to be impractical to use in the fabrication of high-density capacitors and vacuum barrier walls and envelopes.

SUMMARY OF THE INVENTION

An object of the present invention is to provide a high energy capacitor by simultaneously increasing the dielectric constant and the breakdown voltage over prior art limitations.

A further object of the present invention is to provide an insulator with very high breakdown voltage.

A still further object of the present invention is to provide a method for fabricating multilayer dielectric structures.

Briefly, a method of the present invention comprises building a high energy density capacitor using physical vapor deposition to build up alternating layers of zirconium oxide and alumina in between dielectric-conductor interface layers that are, in turn, fabricated between metal conductor electrodes. The alternating layers of zirconium oxide and alumina are so thin that interface phenomena predominates over the dielectric bulk material properties and electron recombination is promoted to an extent great enough that avalanche is avoided.

An advantage of the present invention is a high energy density capacitor is provided for space-constrained applications.

Another advantage of the present invention is a dielectric is provided in which the dielectric constant and breakdown voltage can be engineered to suit particular applications.

A still further advantage of the present invention is a method is provided that allows spatial control and designability over the dielectric constant of particular devices.

BRIEF DESCRIPTION OF THE DRAWINGS

FIG. 1 is a cross section of a perspective view of a multilayer nano-structure embodiment of the present invention having a nano-laminate of different dielectric materials.

DETAILED DESCRIPTION OF THE INVENTION

FIG. 1 illustrates a multilayer nano-structure embodiment of the present invention, referred to herein by the general reference numeral 10. The multilayer nano-structure 10 represents both capacitor and insulator constructions of the present invention. A pair of metal conductive layers 12 and 14 sandwich between them a pair of dielectric-conductor interface layers 16 and 18, and a nano-laminate 20 of two different dielectric material layers 22 and 24. The multilayer nano-structure 10 is preferably fabricated with semiconductor processing techniques, e.g., physical vapor deposition. In one embodiment of the present invention, the two different dielectric material layers 22 and 24 were metal oxides, e.g., zirconium oxide and alumina. The metal conductive layers 12 and 14 were comprised of aluminum.

When alternating layers of various metal-oxide dielectric materials are deposited by a physical vapor deposition (PVD) process, the resulting nano-laminate dielectric can be regarded as a homogenous material having properties contributed from its constituent materials. The selection of which properties are contributed can be engineered. For example, the dielectric constant of the whole can be manipulated. The breakdown voltage can also be raised for the whole, because the alternating layers of dielectric materials allow the interface phenomena to dominate over the bulk properties. The voltage breakdown increases because electrons can be more readily recaptured within the interface prior to avalanche breakdown. The crystalline structures of the dielectric materials can also be controlled, because there are so many dielectric-dielectric interfaces at frequent intervals; and such control improves breakdown voltage performance.

The dielectric-conductor interface layers 16 and 18 can be engineered for increased voltage breakdown and longer service life. Thin interfacial layers of selected metals are applied between the conductors 12 and 14 and the dielectric 20 to increase the local interfacial work function. This reduces charge injection, thus increasing breakdown voltage. The interfacial material is preferably chosen to prevent electrochemical reactions and diffusion between the conductor and dielectric which would otherwise cause a long-term dielectric failure.

Acceleration and regenerative breaking systems in electric and hybrid vehicles require high power capacitors to complement their unusual energy sources. Large, flat nano-structure multilayer structures are suitable for use as load balancing capacitors in electric and hybrid vehicles. Such structures are also useful as snubber capacitors for motor drives, energy discharge capacitors for lasers, and other industrial and military electronics applications.

Nanostructure multilayer materials are characterized by their near-atomic scales and large ratios of interfacial area to volume. Parallel-plate conductor-dielectric structures can be fabricated using multilayer technology with engineered properties affected by materials selection, the synthesis process, and materials processing. Such handles provide a great advantage compared to conventional capacitor fabrication techniques that use only bulk materials.

For certain capacitor applications, power and energy density figures of merit are of interest. Very high power density can be provided by embodiments of the present invention. Relatively large parallel-plate conductors can be used for low resistance. Metal-oxide dielectric materials can be used to provide for low loss. High energy densities are classically obtained by increasing either the dielectric constant (k), or the breakdown voltage (Vb), or both. Increasing the breakdown voltage is especially fruitful, because the energy density increases as the square of the breakdown voltage. The present invention allows the dielectric constant to be manipulated by alternately depositing thin layers of two or more dielectric materials with different dielectric constants. This also allows an intermixing of several materials for an optimum tradeoff between the dielectric constant and the breakdown voltage.

In general, interface rather than bulk phenomena dominate the breakdown process when high electric fields are applied, e.g., the Helmholtz layer phenomenon. By depositing a very thin layer of a particular material between a conductor and a dielectric, the interfacial work function can be adjusted to reduce carrier injection and increase breakdown voltage. This technique may also be used to control electrochemical effects and electro-migration at the conductor-dielectric interface. Atomically smooth interfaces can be maintained over macroscopic distances and thus reduce localized electric field stresses and further enhance the overall whole's breakdown voltage. Multilayer dielectrics allow such flexible application of materials that edge effects can be mitigated that otherwise severely reduce the working voltage of a capacitor. Such edge effects include the intensification of electric field lines at discontinuities, e.g., triple-points.

A sputter deposition apparatus located in the Vapor Phase Synthesis Laboratory of the Chemistry and Materials Science Department at Lawrence Livermore National Laboratory (LLNL) was used to fabricate experimental devices. Such sputter deposition system has the capability to sequentially deposit a nanostructure refractory oxide material with individual component layers (e.g., layers 22 and 24) having thickness of 25 Å to 5000 Å and macroscopic thickness of up to 50 µm in an eight hour deposition run. A metal target is used as the sputtered material source and is maintained in an inert sputter gas atmosphere. Metal atoms are preferably sputtered at rates substantially higher than possible by normal reactive sputtering or by sputtering from a refractory oxide target, but conventional equipment can also be used to produce workable devices. The metal atoms were deposited onto a substrate maintained in an oxygen partial pressure sufficient to oxidize the metal atoms impinging on the deposition surface. This provided for both very high refractory oxide deposition rates and control of the stoichiometry of the depositing material. It has been demonstrated that large-area pinhole-free films can be fabricated using such technology.

The substrates tested were single crystal (100) orientation device-quality silicon having a characteristic surface roughness of 4–6 Å rms. Such substrate material is inexpensive and readily available. Its cleaning procedures are well known. A base electrical contact was deposited over the full surface of the silicon substrate that consisted of a copper-chrome carbide ($Cu/Cr_3C_2$) multilayer structure. This material is very strong, has a smoothness replicating that of the substrate, and is very stable with temperature. The dielectric structure under study was then deposited over the $Cu/Cr_3C_2$ multilayer leaving an electrical contact aperture. A contact array was deposited through a laser-machined contact mask, e.g., using $Cu/Cr_3C_2$ multilayers or high purity (99.999%) aluminum.

The dielectric materials used in the experiments were zirconium dioxide ($ZrO_2$) and aluminum oxide ($Al_2O_3$). These were selected as base line developmental materials for their respective differences in dielectric constants. The literature reports dielectric constants of 21 and 8.8, respectively, for $ZrO_2$ and $Al_2O_3$, a difference of greater than a factor of two. This allowed investigating the effects on the dielectric constant and breakdown characteristics introduced by the relative component layer thickness. Materials with other dielectric constants could also have been used.

The dielectric thickness of experimental structures was measured with a Sloan Dektak that has an uncertainty of ±0.01 µm, implying an accuracy of ±0.3% on a 3 µm sample. The physical structural quality of the nanostructure dielectric materials was characterized using grazing incidence X-ray diffraction to determine the multilayer period. Cross-section transmission electron microscopy (TEM) was used for direct observation of the interfacial characteristics and layer uniformity. The crystal structure of the individual layers was determined both by selected area diffraction (SAD) in the electron microscope and high angle X-ray powder diffractometry (XRD). The composition was determined using Rutherford back scattering spectroscopy (RBS), on specially prepared samples, using an amorphous carbon substrate. Using amorphous carbon substrate eliminated substrate interference with the oxygen, zirconium, and aluminum back scattering signals and substantially enhanced the accuracy of the measurements. The Vicker's hardness was also measured using a standard laboratory micro-indenter apparatus on nanostructure films at least 5 µm thick.

Fundamental electrical characteristics of the test films were measured by conventional means. Capacitance versus frequency, DC breakdown voltage, dielectric resistivity, and capacitance were all measured. The capacitance at each dot was measured with a Hewlett-Packard 4194A impedance gain/phase analyzer with a model 41941A impedance probe. The probe is a four-terminal device usable to 100 MHz. Routine calibration and probe zero/offset adjustments were performed prior to each measurement session. The analyzer displays impedance magnitude and phase versus frequency and computes equivalent circuit parameters using a selected model. The model for these capacitors is a series RLC network, where "R" is the equivalent series resistance (ESR) and "L" is the equivalent series inductance (ESL). Because the capacitor dots used in the experiment were very small, the ESR and ESL measurements were often dominated by parasitic effects.

The breakdown voltage was determined by applying a variable DC high voltage after each specimen was placed in a Petri dish and filled with 3M Fluorinert FC-72 to prevent corona-induced damage or breakdown. A series resistor was used to limit the applied power. The polarity was inadvertently reversed during some of the tests, but this seemed to cause no significant difference in the results. The applied voltage was increased manually in 10 volt and 100 volt steps and also by smooth, continuous adjustment. The latter technique resulted in a higher apparent breakdown voltages. The operator observed the current during the test and noted the presence of current spikes that indicated self-healing breakdowns and large step increases in current that indicated device failure. A record of current versus voltage was kept during the test.

The nanostructure laminate refractory oxide films provided a set of cross-section TEM images of the $ZrO_2/Al_2O_3$ structures and showed equal layer thickness and periods of 10, 20, 100, 200, and 400 nm. The structures demonstrated uniform layering and chemical abruptness in the interfaces. The alumina layers were observed to be amorphous in all cases and independent of thickness or layering. Their composition was determined to be $Al_2O_3 \pm 0.03\%$ by RBS analysis. The crystal structure of the zirconium oxide layers was observed to vary with their thickness independent of layering. For layers less than about 50 nm thick, the zirconium oxide was fully amorphous. Crystallization of the growing layer was observed in the layers that were 50, 100, and 200 nm thick and was observed in a 400 nm period structure. The crystal form of this material was monoclinic and appeared to have a random orientation. RBS analysis of the zirconium oxide material showed it to have the composition $ZrO_2 \pm 0.02\%$, and showed that a slight cross contamination of aluminum in zirconium oxide and zirconium in alumina occurred during synthesis. Such cross contamination was of the same order as the uncertainty in the oxygen concentrations but was clearly observable in the RBS spectra.

Capacitance was measured for each experimental capacitor dot structure. Values ranged from 0.3 nF to 1.0 nF for all the samples. The variation was assumed to be due to the changes in dielectric thickness and composition. The effective dielectric constant, or relative permitivity, was calculated for the multilayer composite material. It ranged from 11 to 18 for volume fractions of $ZrO_2$ ranging from 0.05 to 0.95.

The dielectric constant appears to approximate a linear function of a two-component multilayer dielectrics composition. The functional relationship between effective dielectric constant and volume fraction in multilayer materials appears not to have been addressed in the prior art. Such function is approximately linear over the range of interest.

A wide variation in breakdown voltage was observed among test films and among individual dots. Much of this variation was attributed to particulate contamination. Films that were relatively free of contamination generally showed a higher yield and a higher breakdown strength. This data clearly indicates a need for careful substrate preparation, clean-room practices, and careful design of the deposition system to minimize contamination. This hypothesis was recently confirmed after cleanroom facilities and processes were installed.

While ramping the DC voltage during breakdown testing, all samples showed momentary current spikes, sometimes accompanied by an audible click and a small flash of blue light indicative of an arc. These events were generally followed by a reduction in steady-state leakage current. This is typical self-healing behavior where a defect in the dielectric causes localized electric field intensification, followed by breakdown and vaporization of material in the area of the defect. After the defect is cleared, the potential can be increased until another weak point fails in a similar manner. Eventually, a catastrophic failure occurs, permanently shorting the film.

Maximum DC breakdown voltage was 1200 V for a 3.0 µm dielectric stack that consisted of 2.5 µm of a multilayer (500 Å $ZrO_2$/500 Å $Al_2O_3$) and a 0.5 µm layer of alumina. The electric field at that potential was 4.0. MV/cm. Similar results (3.57 MV/cm) were obtained with a 2.8 µm of a multilayer (100 Å $ZrO_2$/400 Å $Al_2O_3$).

Maximum energy densities, considering only the dielectric material, were 11.0 and 6.9 J/cm$^3$. A practical multilayer capacitor would have up to 10% of its volume occupied by the conductor material and thus would reduce these numbers to 9.9 and 6.2 J/cm$^3$. Additional reductions in working energy density are required for safety factor derating.

The specific energy was calculated by dividing energy density by the density of the dielectric. The density of the multilayer materials of the present invention varies with their composition and in the experiments were 2.3 and 1.6 J/g (0.64 and 0.45 Whr/kg).

It was impractical to accurately measure specific power for the small experimental devices, because the available measurements would be dominated by the parasitic resistance and the inductance of the test fixture. An estimate was obtained from the measured effective series resistance computed by a network analyzer during the measurement of capacitance. The highest-energy sample was 0.4±0.2 ohms. The peak power at the 1200 V breakdown voltage into a matched, non-reactive load (RL=ESR) was 0.9 MW. Dividing this by the mass of the dielectric (0.25 mg) produced a peak specific power of 3.5×10$^9$ W/g. Such a very high value is typical of small, high-quality capacitors used for electronic applications.

A subjective indication of high specific power was observed. When catastrophic breakdowns occurred on the high-energy samples, instantaneous 1 mJ energy discharges resulted in visible holes being blown in the metal dot. The shock waves produced would reverberate in the surrounding dielectric fluid. In some samples, the acoustic shock was enough to delaminate the multilayer from the silicon substrate.

The series of nanostructure multilayer capacitor test films that were fabricated are characterized in Table I. Such tends to show that very high energy and power densities have been experimentally demonstrated.

TABLE I

| dielectric | zirconium oxide/alumina nanostructure multilayer |
| --- | --- |
| conductors | CuCrC multilayer base, Al dots |
| dielectric thickness | 3.0 μm |
| dielectric constant | 15.5 |
| dielectric density | 4.75 g/cm$^3$ |
| dielectric volume | $5.34 \times 10^{-5}$ cm$^3$ |
| dielectric resistivity | $10^{15}$ ohm-cm |
| capacitance | 813 pF |
| breakdown voltage | 1200 V |
| breakdown field | 4.0 MV/cm |
| ESR | 0.4 ohm |
| energy density | 11 J/cm$^3$ (3.1 Whr/l) |
| specific energy | 2.3 J/g (0.64 Whr/kg) |
| specific power | $3.5 \times 10^9$ W/g |

The stoichiometry as a function of oxygen partial pressure ($O_2$ molecule incidence rate onto the substrate) and source power (metal atom deposition rate) are observed to be controllable. The crystal structure can also be controlled to some degree for the $ZrO_2$ by limiting the layer thickness and by layering different materials in adjacent layers. The overall dielectric constant of the composite multilayer dielectric is observed to be a simple function of the individual dielectrics constants of the constituent materials. The dielectric constants of very thin layers of metal oxides may differ from published values for bulk materials. The embodiments of the present invention are expected to show self-healing voltage breakdown capacity. Practitioners of the present invention should control the particulate contamination, as such is vital for successful dielectric synthesis. Other dielectrics and combinations of dielectrics are expected to provide higher dielectric constants. Dielectric-metal interfaces can be modified through the deposition of very thin layers of other materials and should increase the breakdown voltage. Enhancements can be made to the disclosed synthesis techniques, such as the introduction of ozone, to improve stoichiometry control and permit the fabrication of much larger devices. Complex capacitor structures can be fabricated using automated masking apparatus, e.g., as described in U.S. patent application, Ser. No. 08/674,051, filed Jul. 1, 1996 now aandoned by the present Assignee, and is incorporated herein by reference. Such application describes a method and apparatus for making depositions in a vacuum and is generally suitable for nanostructure fabrication of the structure 10.

The present invention includes dielectric materials which are built up from multiple layers of dielectric materials using physical vapor deposition techniques. Such nanostructure multilayer dielectrics allow the engineering of the dielectric constant material at atomic or near-atomic scales. The dielectric constant can be spatially controlled by layering and enhancing the breakdown voltage to exceed the performance of conventional bulk materials. Dielectric materials can be interleaved with widely varying thickness to achieve a wide range of properties. Such nano-composite material can be employed as if it were a bulk dielectric material but with unique characteristics unobtainable by conventional mixtures. Dielectric-to-conductor interfaces can be modified by the addition of thin layers of intermediate materials to adjust the localized interfacial work function, which can reduce carrier injection and increase breakdown voltage.

Therefore, the present invention provides for specialized capacitors to be made for high-energy discharge applications such as lasers, rail guns, electromagnetic effects systems, x-ray generators, etc., and for dielectrics to be made and used in high-energy particle accelerators for physics and weapons applications, microwave, and millimeter-wave striplines and antennas.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A capacitor, comprising:
   at least one pair of metal conductor layers that function as capacitor electrodes;
   a dielectric-conductor interface layer in between and in contact with each of the conductor layers; and
   a multilayer dielectric disposed between and in contact on opposite sides with corresponding dielectric-conductor interface layers and comprising a plurality of alternating layers of oxides of at least two different metals.

2. The capacitor of claim 1, wherein:
   the multilayer dielectric includes zirconium oxide ($ZrO_2$) and alumina ($Al_2O_3$) in alternating layers.

3. The capacitor of claim 1, wherein:
   the dielectric-conductor interface layers are comprised of materials that increase the local interfacial work function, wherein charge injection is limited to provide for increased breakdown voltage.

4. The capacitor of claim 1, wherein:
   the dielectric-conductor interface layers are comprised of materials that provide for a limiting of electrochemical reactions and diffusion between the metal conductor layers and the multilayer dielectric.

5. The capacitor of claim 1, wherein:
   the multilayer dielectric includes metal oxides laid down in alternating layers by physical vapor deposition to form a nano-laminate.

6. An insulator, comprising:
   at least one pair of metal electrodes that provide for mechanical support between;
   a dielectric-conductor interface layer in between and in contact with each of the pair of metal electrodes; and
   a multilayer dielectric disposed between and in contact on opposite sides with corresponding dielectric-conductor interface layers and comprising a plurality of alternating layers of oxides of at least two different metals.

7. The insulator of claim 6, wherein:
   the multilayer dielectric includes zirconium oxide ($ZrO_2$) and alumina ($Al_2O_3$) in alternating layers.

8. The insulator of claim 6, wherein:
   the dielectric-conductor interface layers are comprised of materials that increase the local interfacial work function, wherein charge injection is limited to provide for increased breakdown voltage.

9. The insulator of claim 6, wherein:

the dielectric-conductor interface layers are comprised of materials that provide for a limiting of electrochemical reactions and diffusion between the metal electrodes and the multilayer dielectric.

10. The insulator of claim 6, wherein:

the multilayer dielectric includes metal oxides laid down in alternating layers by physical vapor deposition to form a nano-laminate.

* * * * *